Patented May 12, 1931

1,805,365

UNITED STATES PATENT OFFICE

EUGEN HUBER, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF ETHERIFYING CELLULOSE

No Drawing. Application filed March 20, 1928, Serial No. 263,216, and in Germany March 25, 1927.

The present invention relates to the etherification of cellulose, cellulose derivatives and similar carbohydrates and to the preparatory steps for the etherification.

I have found that cellulose, cellulose derivatives and similar carbohydrates may be converted into a loose, finely dispersed form by distributing them in the presence of water in suitable high boiling organic diluent such as dichlorobenzene, anisol, benzylchloride, high boiling tertiary aromatic amines, especially dimethylaniline, diethyl-p-toluidine, ethylbenzylaniline and others. These organic diluents may be applied in such quantities that a sufficient fine division is obtained by mere stirring.

I have further found that in these suspensions the cellulose, cellulose derivatives and similar carbohydrates can easily be etherified after the addition of the theoretical amount or more of caustic alkalies. When etherifying with high boiling etherifying agents, such as benzylchloride, it is possible to simultaneously use these agents as organic diluents by employing them in excess. Obviously it is possible to remove the bulk of the water and of the organic diluent before carrying out the etherification, but it is to be understood that the presence of the same is in no way disturbing but will in most cases facilitate the etherification.

The following examples illustrate my invention without limiting it thereto:

*Example 1.*—81 g. of cellulose are wetted with 120 g. of water or treated with steam, until the same quantity of water has been absorbed. The mass is then introduced into 800 g. of dimethylaniline while stirring and the mixture stirred, kneaded or beaten in a hollander until the dispersion is uniform throughout the mass. Now 80 g. of caustic soda and, after stirring for 12–24 hours 97 g. of chloride are added and the reaction mixture is heated to about 100 to 105° C. Stirring is continued for about 12–24 hours until all the ethyl chloride has been consumed. A sample of the alkylated product this obtainable is still caused to swell up when treated with an aqueous solution of caustic soda. If such a product is not desired, further 30 g. of caustic soda, and 97 g. of ethyl chloride are added and heating is continued as described above. After cooling the excess of dimethylaniline is removed by sucking off and washing the residue with a suitable dilute acid. The product thus obtained forms a greyish white, hard and granulated mass, easily soluble in benzene + alcohol, tetrachloromethane and other suitable organic solvents to a clear, colorless solution. When treated with cold water it is only caused to swell up at the surface.

*Example 2.*—In a mixture of 800 g. of diethylaniline and 80 g. of water, 81 g. of cellulose are introduced while stirring until the dispersion is complete. After the addition of 80 g. of caustic soda and further stirring for 12 hours the bulk of the water together with part of the diethylaniline are removed by distilling in vacuo. The etherification of the cellulose is performed by the addition of 170 g. of ethyl chloride at 120–130° C. within 24 hours. The product thus obtainable forms a light grey powder which is not swelled up by cold water and which is easily soluble in the usual organic solvents such as benzene, alcohol, tetrachloromethane, and others, whereby either clear or gelatinizing solutions are obtained.

*Example 3.*—To 200 ccm. of o-dichlorobenzene 81 g. of starch and then 140 g. of soda lye of 50% strength together with 320 g. of benzylchloride are added while stirring. The temperature is now raised to about 110–115° C., whereby the water is caused to distil off. When the etherification is finished the reaction product after removal of the organic solvent forms a colorless brittle mass, soluble in different organic solvents to thinly liquid colorless solutions.

*Example 4.*—40 g. of cellulose are distributed in 300 g. of a mixture of anisol and 40 g. of water by stirring, then 30 g. of caustic soda are added and the mixture is stirred for about 12 hours at ordinary temperature. After that time it is heated at about 60° C. and 160 g. of diethylsulfate and 60 g. of caustic soda are added within ten hours. The working up of the reaction mass is the same as described in Example 1. The ethylated cellulose thus obtained forms a white powder soluble or able to swell up in many of the usual organic solvents.

*Example 5.*—81 g. of cellulose are introduced in a mixture of 700 g. of benzylchloride and 80 g. of water and stirred until a homogeneous dispersion has been formed. Stirring is continued for about 10 hours after the addition of 100 g. of caustic soda and the mixture is then heated first at 110–115° C. and then at about 120–130° C. During this time water and benzylchloride are allowed to distil off, the remainder of which may be removed by distillation in vacuo. The residue is dissolved in benzene and the benzylcellulose may be obtained from this solution in form of clear films or in granulated form when precipitated by means of alcohol, ether and similar solvents.

*Example 6.*—Hydrocellulose obtained from 81 g. of cellulose by one of the known processes and containing about 100 g. of water is ethylated in 700 g. of dimethylaniline with the addition of 90 g. of caustic soda in the usual manner. The product thus obtainable is easily soluble in benzene and other suitable organic solvents, which solutions are of especially low viscosity.

I claim:

1. The process which comprises introducing cellulose into a mixture of an aromatic high boiling tertiary amine and water, stirring until a homogeneous dispersion has formed, introducing then the amount of caustic alkali which is necessary for effecting conversion of the cellulose into alkali cellulose and subjecting the alkali celluose thus formed in the reaction mixture to the action of an etherifying agent.

2. The process which comprises introducing cellulose into a mixture of dimethyl aniline and water, stirring until a homogeneous dispersion has formed, introducing then the amount of caustic alkali which is necessary for effecting conversion of the cellulose into alkali cellulose and subjecting the alkali cellulose thus formed in the reaction mixture to the action of an etherifying agent.

3. The process which comprises introducing cellulose into a mixture of dimethyl aniline and water, stirring until a homogeneous dispersion has formed, introducing then the amount of caustic soda which is necessary for effecting conversion of the cellulose into alkali cellulose and subjecting the alkali cellulose thus formed in the reaction mixture to the action of ethyl chloride at a temperature of about 100–105° C.

In testimony whereof I have hereunto set my hand.

EÜGEN HUBER.

CERTIFICATE OF CORRECTION.

Patent No. 1,805,365.  Granted May 12, 1931, to

EUGEN HUBER.

It is hereby certified that error appears in the printed specification of the above numbered patent requiring correction as follows: Page 1, line 43, before the word "chloride" insert the word ethyl, and line 47, for "this" read thus; and that the said Letters Patent should be read with these corrections therein that the same may conform to the record of the case in the Patent Office.

Signed and sealed this 4th day of August, A. D. 1931.

(Seal)

Wm. A. Kinnan,
Acting Commissioner of Patents.